Figure 1:
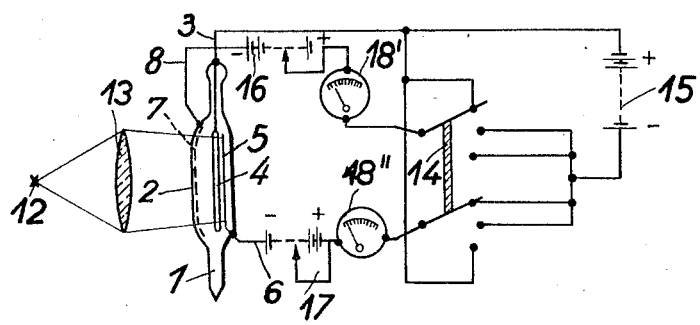

Oct. 24, 1939.   P. KECK   2,177,259
EMISSION TYPE PHOTOTUBE
Filed Nov. 5. 1937

Inventor:
Paul Keck

Patented Oct. 24, 1939

2,177,259

UNITED STATES PATENT OFFICE 2,177,259

EMISSION TYPE PHOTOTUBE

Paul Keck, Jena, Germany, assignor to the firm Carl Zeiss, Jena, Germany

Application November 5, 1937, Serial No. 173,003
In Germany November 10, 1936

3 Claims. (Cl. 250—41.5)

An application has been filed in Germany, November 10, 1936.

In the known tubes sensitive to an external photoelectric effect, sensitivity to coloured light depends on the material of the cathode. The tubes are, as a rule, sufficiently sensitive only within a comparatively narrow range of wavelengths of the visible spectrum. The well-known caesium tubes, for instance, are sensitive especially to red light, and their reaction upon blue and green light is very slight and not sufficient for measuring purposes. Potassium tubes, in their turn, are sensitive substantially to blue light.

For measuring purposes, phototubes are required which can be used for light of the entire spectrum. The invention, which aims at coming up to this requirement, concerns a phototube whose photocathode consists of a plurality of independent parts each of which is sensitive substantially to light rays of a definite range of wave-lengths, this phototube being for use in a device for measuring radiations of light consisting of portions of different wave-lengths. In a device for measuring radiations consisting of portions of different wave lengths a phototube of the said kind is used in which said cathode layers are electrically separate in said envelope and conducted separately to the outside by special conductors. Also said anode is conducted to the outside by a special conductor, between which and first said conductors are connected other elements, comprising a D. C. potential source and at least one galvanometer. According to the invention, the phototube comprises in combination an evacuated glass envelope, at least one anode and a cathode consisting of a plurality of independent layers which are sensitive to rays of different wave-lengths and arranged partly on the back wall of said envelope and partly on the front wall of said envelope, said front-wall layers being of such thickness that part of the light striking said front-wall layers is transmitted through them to said back-wall layers. Accordingly, the tube can contain, for instance, a two-part photocathode which consists of materials used per se for such cathodes and whose one part is of a material sensitive especially to blue, and whose other part is of a material sensitive especially to red light. As the said parts are electrically insulated from each other, the said parts can be used separately or conjointly. By using suitable materials for the cathode, it is attained in both the said cases that the spectral sensitivity of the cell approximates a predetermined magnitude, for instance that of the sensitivity of the human eye.

As, according to the invention, the parts of the photocathode are insulated in the tube with respect to each other, the tube can be readily used as if the one part of the front wall cathode were the only existent. The sensitivity of the tube corresponds in this case to the spectral sensitivity of this one cathode part when the remaining parts of the cathode, which are not used, are connected to the anode of the tube.

By providing that one of the parts is a partially transparent layer on the wall containing the window and giving this part a desired thickness, or transparency, it is possible to control the portion of light striking the remaining cathode parts, which are on the rear wall of the tube. A vacuum cell of this kind which has two cathode parts insulated with respect to each other reacts in a special manner when these parts have different potentials with respect to the anode. Most of the electrons emitted by the cathode part having the higher negative potentials strike the other cathode part, where they release a secondary electron emission to the anode. The primary photo-electric current is consequently amplified, and the spectral sensitivity of the cell is transformed to a sensitivity corresponding to the cathode part having the higher negative potential. By changing the different tube potentials, it is possible in this manner to alter the spectral sensitivity of the tube and to adapt this sensitivity to a predetermined outline of the curve of sensitivity, for instance to that of the curve of the sensitivity of the human eye.

The scope and the kind of application of the photoelectric cells according to the invention are illustrated by way of examples in the accompanying drawing, in which—

Figure 2:
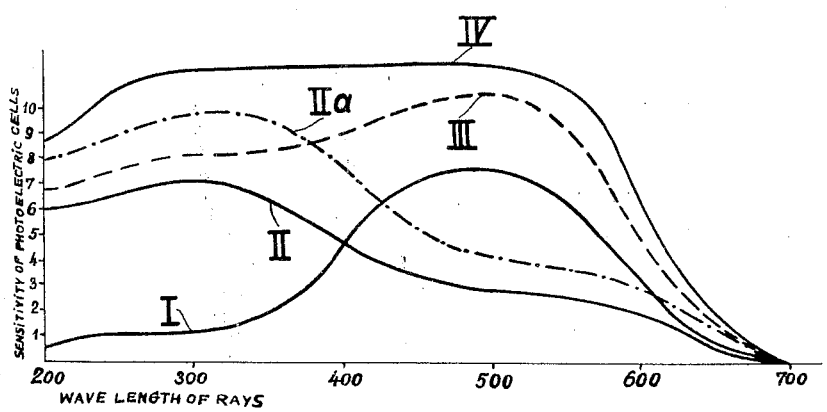

Fig. 1 shows a phototube in which the one cathode is on the rear wall and the other cathode on the front wall; and Fig. 2 represents the sensitivity curves of the phototubes.

The tubes are glass bodies 1 the one wall of which has a window 2 for the entrance of light. Into the upper end of the glass body 1 is fused an electric supply wire 3 connected to a ring anode 4 inside the tube.

A caesium layer 5 is positioned on the rear wall of the tube, opposite the window 2, and to this layer is electrically connected a supply wire 6 fused into the wall of the cell and leading to the outside. On the cell wall containing the window is a caesium-antimony layer 7 which is partly transparent and sensitive especially to blue and green light, this layer being electrically connected to a supply wire 8 fused into the tube. The two layers 5 and 7 constitute the cathode of the tube and are not electrically interconnected in the tube.

In this tube, the outline of the sensitivity curve depends on the thickness of the caesium-antimony layer 7. The less light traverses the layer 7 and then strikes the layer 5, the smaller is the sensitivity of the tube to red and the greater is the sensitivity of the tube to blue and green light when both cathode parts lie in the potential circuit of the anode 4. By disconnecting the one part or the other, the tube can be used as one of the ordinary cells having a single cathode, in which case the outline of the sensitivity curve corresponds to the material of the cathode part remaining in circuit.

A possibility of using the tube according to the invention is illustrated in Fig. 1 by means of a simple device of electric connection. The light of a source of radiation 12 to be examined is directed to the photo-electric layers by a lens 13.

One or the other cathode layer, at option, can be short-circuited to the anode, or both cathode layers can be connected at one and the same time. To this effect, the current circuits have a common D. C. potential source and for each cathode circuit further D. C. potential sources 16 and 17 and galvanometers 18' and 18", respectively. By changing the potentials supplied by the D. C. potential sources 16 and 17, the sensitivity of each part can be altered and, moreover, the above-mentioned emission of secondary electrons can be effected.

In the graphical representation in Figure 2, the curve I shows the dependency of the sensitivity of the layer 5, and the curve II that of the sensitivity of the layer 6. By altering the suction potentials of the batteries 16 and 17 in Figure 1, the curves I and II can be raised or lowered, the curve II being transformed, for instance, to a curve II$^a$, and the total characteristic of the curve III being displaced to IV.

I claim:

1. A phototube comprising in combination an evacuated glass envelope, at least one anode, and a cathode consisting of a plurality of independent layers sensitive to rays of different wave-lengths, said cathode layers being arranged partly on the back wall of said envelope and partly on the front wall of said envelope, said front-wall layers being of such thickness that part of the light striking said front-wall layers is transmitted through them to said back-wall layers.

2. In a device for measuring radiations consisting of portions of different wave-lengths a phototube comprising in combination an evacuated glass envelope, at least one anode, and a cathode consisting of a plurality of independent cathode layers sensitive to rays of different wave lengths, said cathode layers being arranged partly on the back wall of said envelope and partly on the front wall of said envelope, said front-wall layers being of such thickness that part of the light striking said front-wall layers is transmitted through them to said back-wall layers, said cathode layers being electrically separate in said envelope and conducted separately to the outside by special conductors, and said anode being conducted to the outside by a special conductor, and other elements comprising a D. C. potential source and at least one galvanometer connected between said conductors.

3. In a device for measuring radiations consisting of portions of different wave-lengths a phototube comprising in combination an evacuated glass envelope, at least one anode, and a cathode consisting of a plurality of independent cathode layers sensitive to rays of different wave-lengths, said cathode layers being arranged partly on the back wall of said envelope and partly on the front wall of said envelope, said front-wall layers being of such thickness that part of the light striking said front-wall layers is transmitted through them to said back-wall layers, said cathode layers being electrically separate in said envelope and conducted separately to the outside by special conductors, and said anode being conducted to the outside by a special conductor, a plurality of auxiliary D. C. potential sources adapted to be varied with respect to magnitudes of potential, and galvanometers connected in series to said source and between said conductors of said cathode layers on the one hand and said conductor of said anode on the other hand.

PAUL KECK.